United States Patent
Ord et al.

(10) Patent No.: US 7,255,286 B2
(45) Date of Patent: Aug. 14, 2007

(54) TEMPERATURE COMPENSATION VALVE

(75) Inventors: George Ord, East Aurora, NY (US); Lawrence Gill, Grand Island, NY (US); Daniel Korpanty, Clarence, NY (US)

(73) Assignee: Carleton Technologies, Inc., Orchard Park, NY (US)

( * ) Notice: Subject to any disclaimer, the term of this patent is extended or adjusted under 35 U.S.C. 154(b) by 415 days.

(21) Appl. No.: 10/805,074

(22) Filed: Mar. 19, 2004

(65) Prior Publication Data

US 2005/0205681 A1   Sep. 22, 2005

(51) Int. Cl.
*G05D 23/02* (2006.01)

(52) U.S. Cl. .................... 236/93 A; 236/99 J; 236/100

(58) Field of Classification Search ............... 62/173, 62/185; 236/92 C, 93 A, 93 R, 100, 99 J; 251/264, 276, 278
See application file for complete search history.

(56) References Cited

U.S. PATENT DOCUMENTS

| | | | |
|---|---|---|---|
| 55,784 A * | 6/1866 | Roach .................... 251/276 |
| 3,747,623 A | 7/1973 | Greenwood et al. |
| 3,870,457 A | 3/1975 | Perl |
| 4,067,539 A | 1/1978 | Perl |
| 4,203,545 A * | 5/1980 | Fackler .................. 236/93 A |
| 4,254,312 A | 3/1981 | Migrin et al. |
| 4,355,654 A | 10/1982 | Levesque et al. |
| 4,932,438 A | 6/1990 | Kitamura et al. |
| 5,074,152 A | 12/1991 | Ellner et al. |
| 5,220,837 A | 6/1993 | Silverwater |
| 5,265,644 A | 11/1993 | Tuckey |
| 5,600,071 A | 2/1997 | Sooriakumar et al. |
| 5,685,493 A | 11/1997 | Grytz et al. |
| 5,727,529 A | 3/1998 | Tuckey |
| 5,775,670 A | 7/1998 | Osterbrink |
| 5,915,355 A | 6/1999 | Andreasson |
| 5,992,822 A | 11/1999 | Nakao et al. |
| 6,112,368 A * | 9/2000 | Luckett .................... 16/59 |
| 6,213,142 B1 | 4/2001 | Engdahl |
| 6,293,514 B1 | 9/2001 | Pechoux et al. |
| 6,341,620 B1 * | 1/2002 | Mutter .................. 137/468 |
| 6,413,238 B1 | 7/2002 | Maget |
| 6,530,273 B1 | 3/2003 | Gottlieb et al. |

* cited by examiner

*Primary Examiner*—Marc Norman
(74) *Attorney, Agent, or Firm*—Jaeckle Fleischmann & Mugel, LLP

(57) ABSTRACT

A temperature compensation valve is hereby provided wherein the inner cavity of the valve comprises a puck, a metal piston (gas control device), and a spring. The spring serves to bias the piston towards the puck, and the puck expands and contracts proportionately in response to increases and decreases in temperature of the upstream gas. Furthermore, the piston will move accordingly, wherein an increase in temperature causes the expansion of the puck directing the piston in such a way to obstruct the orifice that allows the gas to pass through the valve, thereby controlling the gas flow to compensate for the pressure variations.

23 Claims, 2 Drawing Sheets

TEMPERATURE COMPENSATION VALVE

TECHNICAL FIELD

The present invention relates generally to flow valves and, more specifically, to a mechanically operative gaseous flow valve that serves to compensate for pressure variations caused by fluctuations in temperature.

BACKGROUND OF THE INVENTION

Flow valves that serve to regulate the flow of fluids in environments that are subjected to extreme temperature fluctuations are known. Generally, a change in temperature to the environment of the container holding the fluid causes a change in temperature of the fluid contained within. Additionally, this change in temperature causes either an increase, or a decrease in pressure. Generally, an increase in temperature causes an increase in pressure, and a decrease in temperature causes a decrease in pressure. When you apply these changes in pressure to an actuator the performance of the actuator also changes. Inside a typical actuator resides a piston wherein applying a high pressure flow on that piston will instigate a greater force. The greater force causes the actuator to move with greater velocity. Conversely, if temperature is low, then pressure is low. The low pressure causes a decrease in force exerted on the piston. This decrease in force causes the piston to move slower. It is desirable to control flow of gas into the actuator so that when temperature and pressure are low, the orifice that regulates the flow of the fluid is larger, thereby allowing gas to flow quickly into the actuator. Conversely, when the temperature and pressure are high the aforementioned orifice of the valve should be smaller, so that the gas flow into the actuator is restricted.

In view of the above, it is essential for many applications to keep the flow rate of fluid constant while temperature fluctuates between hot and cold extremes. One such application, requiring a constant flow rate during temperature fluctuations, is in the field of aeronautics.

Devices that provide a stable fluid flow are known. One such device is the Fluid Dispenser With Stabilized Fluid Flow described in U.S. Pat. No. 6,413,238. The device provides a fluid dispenser and method of operation. The device includes a feedback system which allows the device to respond in a timely and measured manner to changes in the dispensing flow rate of fluid from the device. The device has a fluid reservoir and an outlet which optionally may have a flow or pressure resistance unit incorporated, into the outlet, and an electric gas generation module or reversible pump which provides gas pressure to dispense the fluid from the reservoir. The device also has a sensor for detecting and measuring internal or external operating parameter indicative of flow rate of the fluid being dispensed. Feedback from the sensor is used by a controller to control electric current to the gas generation module, with the current being adjusted by the controller to adjust the amount of gas produced in a manner which will prevent the flow rate of the dispensed fluid from exceeding desired maximum or minimum limits.

While the aforementioned device regulates the flow of a fluid and adjusts for changes in pressure, the device is extremely complex and requires many electronic components including sensors and detection units. Additionally, such a device is expensive to manufacture.

An additional device for regulating a fluid is disclosed in the Blue Flame Gas Smooth Top Range of U.S. Pat. No. 3,870,457. The thermal fuel valve is used with an electric igniter in a gas range appliance to control gas flow while the igniter provides automatic gas ignition at a burner. The electric igniter is positioned next to the burner and an internal electric heater in the thermal fuel valve enclosure is positioned to heat a thermally responsive heat warpable actuator that moves the poppet to open the valve when the devices are connected for series electric energization. The thermal fuel valve will open and allow gas to flow to the burner only when the electric igniter has been energized. Furthermore, the valve is calibrated to open only when the igniter is near or at a temperature suitable for igniting the gaseous fuel. Since the force required to be exerted by the actuator to move the poppet from its seat is dependent on the gas pressure in the valve, such calibration normally would take into consideration the normal gas pressure.

While the aforementioned device either opens or closes depending on temperature, it does not serve to regulate the flow rate of fluid constant while temperature fluctuates between hot and cold extremes. The device merely allows for gas to flow provided the temperature is at an appropriate level.

What is needed in the art is a gas valve that maintains a defined flow rate across a temperature range even though the upstream pressure fluctuates with temperature.

Furthermore, what is needed in the art is a gas valve that maintains a defined flow rate across a temperature range even though the upstream pressure fluctuates with temperature, wherein the gas valve is substantially mechanical and does not require additional temperature monitoring or controlling devices.

SUMMARY OF THE INVENTION

The present invention provides a gas valve that maintains a substantially constant, or defined flow rate across a temperature range even though the upstream pressure fluctuates with temperature.

Furthermore, the present invention provides a gas valve that maintains a substantially constant or defined flow rate regardless of fluctuations in temperature or pressure that is substantially mechanical and does not require additional temperature monitoring or controlling devices.

A temperature compensation valve is hereby provided wherein the inner cavity of the valve comprises a puck, a metal piston (gas control device), and a spring. The puck is preferably comprised of a non-metallic material having a coefficient of expansion than the piston. The spring serves to bias the piston towards the puck, and the puck expands and contracts proportionately in response to fluctuations in temperature of the upstream gas. The system can be under tuned or over tuned to obtain a desired flow rate verses temperature. Additionally, the piston may further comprise a pair of O-rings on opposite sides of the orifice.

A particular embodiment of the gas valve may further comprise a fine tune adjustor for moving the piston to the appropriate bias position at room temperature. Furthermore, a position measurement rod may be included to assure proper operation of the valve and provide the operator with a visual indication of the position of the piston.

BRIEF DESCRIPTION OF THE DRAWINGS

The above-mentioned and other features and advantages of this invention, and the manner of attaining them, will become appreciated and be more readily understood by reference to the following detailed description of one embodiment of the invention in conjunction with the accompanying drawings, wherein.

DETAILED DESCRIPTION OF THE DRAWINGS

Figure 1:
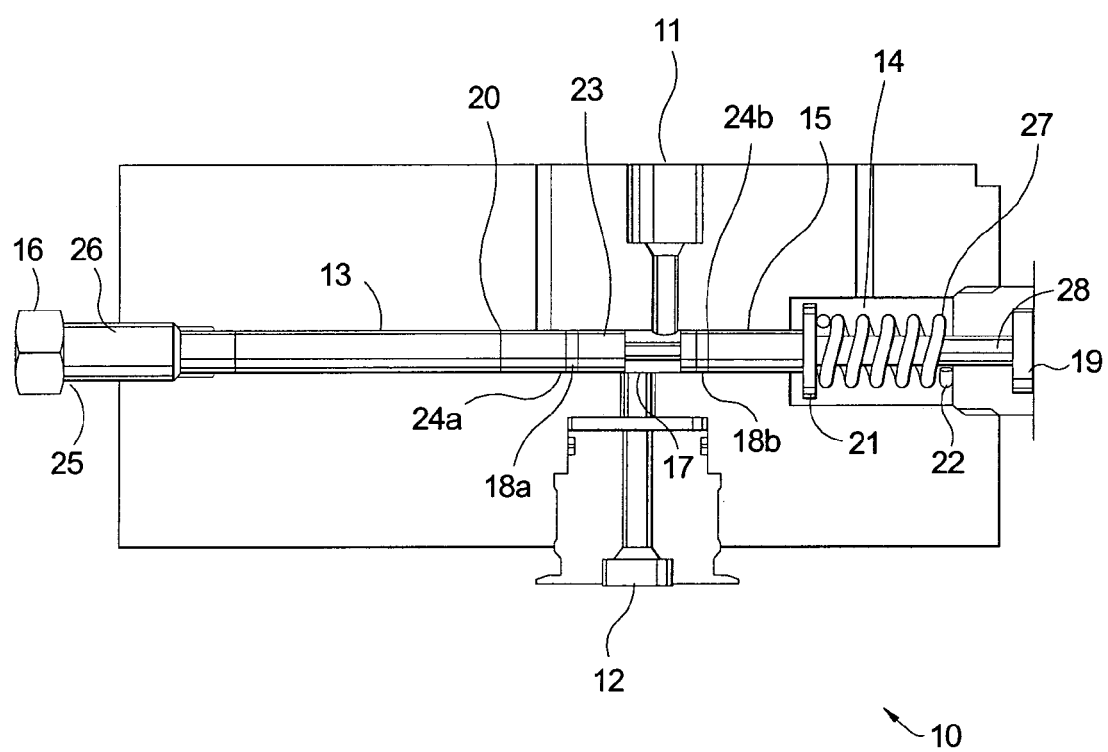
FIG. 1 is a longitudinal cross sectional view of the temperature compensation valve of the present invention.

Referring now to the drawings, and particularly to FIG. 1, there is shown an embodiment of the temperature compensation valve 10 of the present invention. The temperature compensation valve 10 comprises in one form thereof an inner cavity further comprising a puck 13, a piston or gas control device 15, and spring 14. While the preferred embodiment specifies a fluorosilicone elastomeric rubber puck, any suitably sized device that expands and contracts when exposed to fluctuations in temperature may be used. Additionally, while the piston 15 in the illustrated embodiment is metal, any suitable material may be used.

Referring again to FIG. 1, the spring 14 serves to bias the piston 15 toward the puck 13. Furthermore, the puck 13 expands and contracts proportionately in response to increases and decreases in temperature of the upstream gas. The piston 15 will move accordingly, wherein an increase in temperature causes the puck 13 to expand, thereby directing the piston 15 to obstruct the orifice 17, through which gas flows from the inlet 11 to the outlet 12.

In operation, a gas enters the valve 10 through the inlet 11 and exits the valve 10 through the outlet 12. A pressure balanced metal piston 15 is positioned between the inlet 11 and the outlet 12 to modulate flow rate as a function of temperature. As temperature increases, the puck 13 expands, thereby urging the piston 15 toward the spring 14. In addition to compressing the spring, the expansion of the puck 13 also causes the piston to cross the threshold of the orifice 17, thereby obstructing flow through the orifice 17. As the piston 15 is further forced in opposition to the spring 14, the piston 15 covers a greater portion of the orifice 17, thereby effectively regulating the flow through the orifice 17.

The piston 15 further comprises a pair of O-rings 18a and 18b. The O-rings 18a and 18b are seated within a pair of annular groves 24a and 24b in the outer wall 23 of the piston 15, and communicate with the inner wall of the inner cavity (not shown) of the temperature compensation valve 10. Additionally, the piston 15 further comprises a first end 20 and a second end 21, wherein said second end 21 has a flange 22 suitable for retaining the biasing spring 14.

As temperature surrounding the valve decreases the puck 13 contracts. At this point, the spring 14 urges the piston 15 toward the puck 13, thereby effectively increasing the orifice area 17 and allowing for increased gas flow. The net result is a substantially constant or predetermined gas pressure downstream of the orifice despite variation in upstream pressure caused by fluctuations in temperature.

A particular embodiment of the present invention further comprises a fine tuning adjuster 16. The fine tuning adjustor 16 provides the operator a means for moving the piston 15 to appropriate bias position at room temperature, thereby allowing operator to compensate for various expansion rates and qualities of the puck 13. The fine tuning adjuster 16 comprises in one form thereof a threaded nut 25 and a threaded fitting 26, wherein advancing the threaded nut 25 into the threaded fitting 26 urges the puck 13 toward the piston 15, causing the piston to increasingly obstruct the orifice 17. Conversely, turning the threaded nut 25 in the opposite direction effectively allows the biasing spring 14 to urge the piston 15 away from the orifice 17, thereby increasing the size of the orifice 17 opening.

Furthermore, a particular embodiment of the present invention may include a position measurement rod 19. Generally, the position measurement rod 19 will protrude outward from the valve 10, and provides the operator with a visual indication of the current position of the piston 15 within the valve 10. The position measurement rod 19 comprises a center rod 27 and an end knob 28. The center rod 27 is in communication with the flanged end 21 of the piston 15 and is substantially surrounded by the biasing spring 14. As the piston 15 advances toward the biasing spring 14, the flanged end 21 of the piston 15 also advances the center rod 27 and an end knob 28 from the valve housing. Conversely, as the biasing spring urges the piston away from the orifice, the center rod 27 and an end knob 28 retreat into the valve housing, thereby providing a visual indication of the position of the piston 15. The position indication rod 19 and fine tuning adjuster 16 allow for calibration and maintenance of the temperature compensation valve 10.

Figure 2:
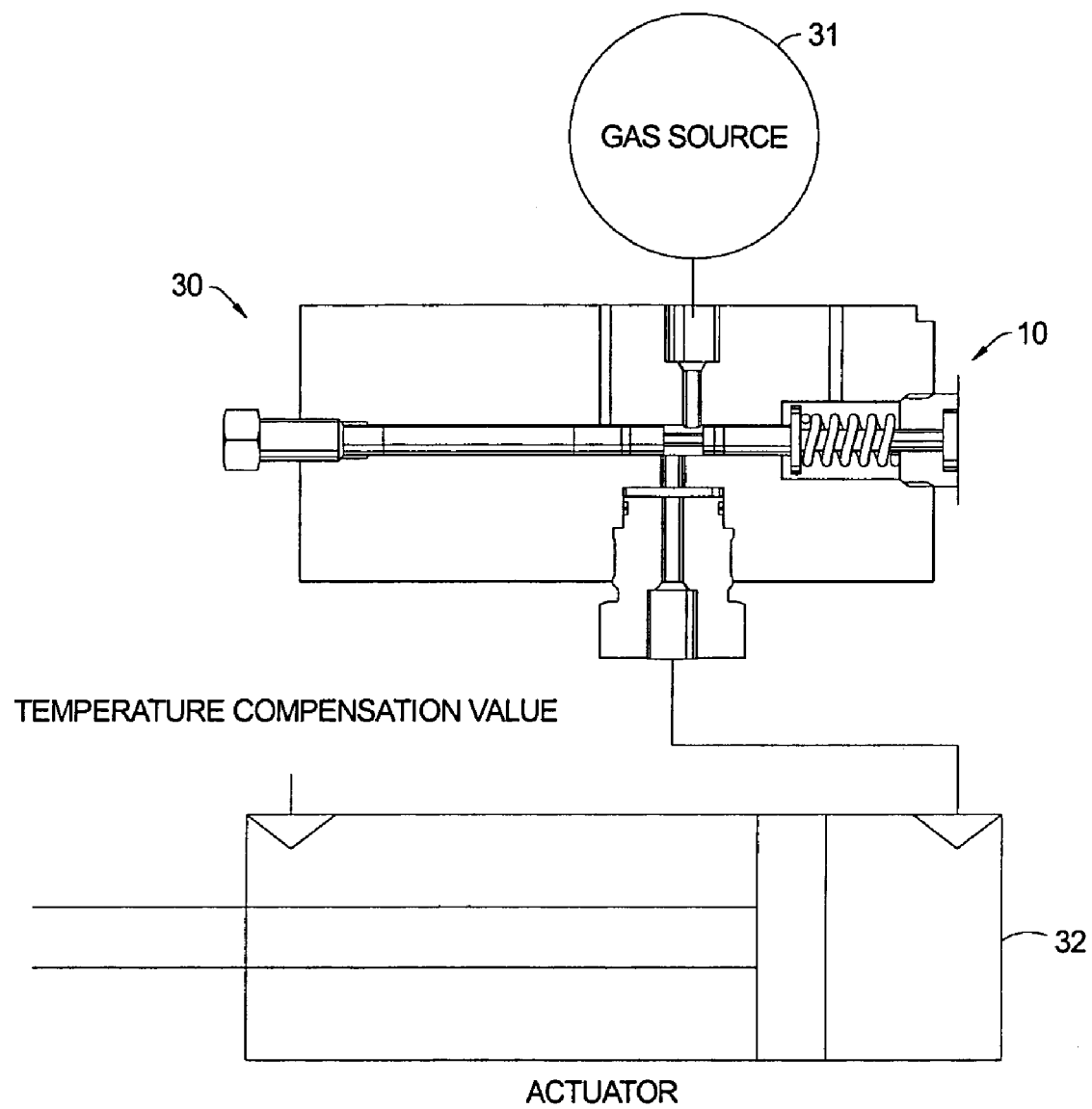
FIG. 2 is a pneumatic control system having the temperature compensation valve of the present invention.

Referring to FIG. 2, a pneumatic control system 30 having the temperature compensation valve 10 as disclosed above is shown. The pneumatic control system 30 includes a gas source 31 for delivering gas to the inlet 11 of the temperature compensation valve 10. The outlet 12 of the temperature compensation valve 10 is in fluid communication an actuator 32.

Additionally an embodiment of the present invention is contemplated wherein the length of the biasing spring 14 may be aptly selected to counter the expansion of a puck 13 thereby causing the position of the diaphragm or piston 15 to remain substantially unchanged over a range of temperatures. In a classical helical spring controlled regulator the sensing spring load determines the regulator output pressure. The output pressure acts on one side of a diaphragm or piston 15 while the spring acts 14 on the other side. At the point where a force balance occurs the spring load is equal to the pressure multiplied by the diaphragm area. Hence there is a direct relationship between the spring force and the regulator pressure.

As regulator temperature decreases, the modulus of rigidity of the spring material 14 increases and hence the spring force, for the same spring deflection, becomes greater causing the regulator output pressure to increase. By placing a material (a rubber puck 13 for example) in series with the spring 14 this increase in force can be countered. The coefficient of expansion of the material causes the puck 13 to contract at colder temperatures and due to the differing coefficient of expansion between the body of the regulator and the material 13 the length of the spring 14 increases. This reduces the spring 14 deflection and hence reduces the force it applies to the diaphragm 15. If the change in spring 14 length is chosen correctly it can exactly oppose the increase in force due to the modulus change. As temperature increases the process is reversed, wherein the spring 14 modulus decreases and the puck 13 length increases thereby assuring that the spring force remains unchanged.

The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

We claim:

1. A temperature compensation valve comprising:
    an enclosure having an inlet and an outlet;
    an orifice allowing for communication between the inlet and the outlet; and
    means for varying said orifice size to allow for a substantially constant, defined flow rate with fluctuations in temperature, said means comprising a piston positioned across the inlet to modulate flow rate as a function of temperature, said piston comprising a first side and a second side,
        a puck adjacent said first side of said piston, said puck expanding as temperature increases, thereby urging said piston toward said orifice;
        biasing means adjacent said second side of said piston; and
        a fine tuning adjuster.

2. The temperature compensation valve of claim 1 wherein said biasing means is a spring.

3. The temperature compensation valve of claim 1 wherein said second side of said piston further comprises a flanged end for retaining said biasing means.

4. The temperature compensation valve of claim 1 wherein said biasing means urges said piston away from said orifice.

5. The temperature compensation valve of claim 1 wherein said puck is a comprised of a material with a temperature expansion coefficient different than the temperature expansion coefficient of the enclosure material.

6. The temperature compensation valve of claim 5 wherein said puck comprises a fluorosilicone elastomeric rubber.

7. The temperature compensation valve of claim 1 wherein said piston further comprises a pair of annular grooves, wherein each of said annular grove has an O-ring seated within.

8. The temperature compensation valve of claim 1 wherein said fine tuning adjuster comprises a threaded nut and a threaded fitting wherein advancing said threaded nut into said threaded fitting urges said puck toward said piston to thereby reduce the size of said orifice.

9. The temperature compensation valve of claim 1 further comprising a position measurement rod.

10. The temperature compensation valve of claim 9 wherein said position measurement rod further comprises:
    a center rod and an end knob, said center rod having a first end and a second end; wherein
    said first end of said center rod is in communication with said piston and said second end of said center rod is in communication with said end knob; and
    said end knob protrudes from said valve to provide a visual indication of the position of said piston.

11. The temperature compensation valve of claim 10 wherein said center rod is substantially surrounded by said biasing means.

12. A pneumatic control system comprising:
    a source of gas, a temperature compensation valve, and an actuator;
        said temperature compensation valve further comprising an enclosure having an inlet and an outlet, an orifice allowing for communication between the inlet and the outlet; and a means for varying said orifice size to allow for a substantially constant defined flow rate with fluctuations in temperature, said means comprising a piston positioned across the inlet to modulate flow rate as a function of temperature, said piston comprising a first side and a second side;
        a puck adjacent said first side of said piston, said puck expanding as temperature increases, thereby urging said piston toward said orifice
        biasing means adjacent said second side of said piston; and
        a fine tuning adjuster.

13. The pneumatic control system of claim 12 wherein said biasing means is a spring.

14. The pneumatic control system of claim 12 wherein said second side of said piston further comprises a flanged end for retaining said biasing means.

15. The pneumatic control system of claim 12 wherein said biasing means urges said piston away from said orifice.

16. The pneumatic control system of claim 12 wherein said puck is a comprised of a material with a temperature expansion coefficient different than the temperature expansion coefficient of the enclosure material.

17. The pneumatic control system of claim 12 wherein said piston further comprises a pair of annular grooves, wherein each of said annular grove has an O-ring seated within.

18. The pneumatic control system of claim 12 wherein said fine tuning adjuster comprises a threaded nut and a threaded fitting wherein advancing said threaded nut into said threaded fitting urges said puck toward said piston to thereby reduce the size of said orifice.

19. The pneumatic control system of claim 12 further comprising a position measurement rod.

20. The pneumatic control system of claim 19 wherein said position measurement rod further comprises:
    a center rod and an end knob, said center rod having a first end and a second end; wherein
    said first end of said center rod is in communication with said piston and said second end of said center rod is in communication with said end knob; and
    said end knob protrudes from said valve to provide a visual indication of the position of said piston.

21. The pneumatic control system of claim 20 wherein said center rod is substantially surrounded by said biasing means.

22. The pneumatic control system of claim 12 wherein said puck comprises a fluorosilicone elastomeric rubber.

23. A method of compensating for fluctuations in temperature for a temperature compensation valve comprising a piston positioned in series with a spring having a spring rate and a puck, said method comprising the steps of:
    determining the a change in spring force due to temperature;
    determining the a temperature coefficient of expansion of a puck;
    selecting a puck length such that said length multiplied by said temperature coefficient of expansion and multiplied by said spring rate is equal to said change in spring force due to temperature wherein said spring rate is substantially constant; thereby assuring that the pressure in said regulator remains substantially unchanged due to fluctuations in temperature.

* * * * *